US010691974B2

(12) United States Patent
Lin et al.

(10) Patent No.: US 10,691,974 B2
(45) Date of Patent: Jun. 23, 2020

(54) SUPERPIXEL CLASSIFICATION METHOD BASED ON SEMI-SUPERVISED K-SVD AND MULTISCALE SPARSE REPRESENTATION

(71) Applicant: Harbin Institute Of Technology, Harbin, Heilongjiang (CN)

(72) Inventors: Lianlei Lin, Heilongjiang (CN); Jingli Yang, Heilongjiang (CN); Chang'an Wei, Heilongjiang (CN); Zhuxu Zhou, Shandong (CN)

(73) Assignee: Harbin Institute Of Technology, Harbin (CN)

( * ) Notice: Subject to any disclaimer, the term of this patent is extended or adjusted under 35 U.S.C. 154(b) by 146 days.

(21) Appl. No.: 16/058,018

(22) Filed: Aug. 8, 2018

(65) Prior Publication Data
US 2020/0019817 A1    Jan. 16, 2020

(30) Foreign Application Priority Data

Jul. 11, 2018 (CN) .......................... 2018 1 0757826

(51) Int. Cl.
  *G06K 9/00* (2006.01)
  *G06K 9/62* (2006.01)
(52) U.S. Cl.
  CPC ......... *G06K 9/6249* (2013.01); *G06K 9/6255* (2013.01); *G06K 9/6257* (2013.01); *G06K 9/6269* (2013.01)
(58) Field of Classification Search
  CPC .. G06K 9/6249; G06K 9/6255; G06K 9/6257; G06K 9/6269

USPC ........................................................ 382/159
See application file for complete search history.

(56) References Cited

U.S. PATENT DOCUMENTS

| 8,515,473 | B2* | 8/2013 | Mody | .................... H04K 3/226 |
| | | | | 455/450 |
| 9,734,601 | B2* | 8/2017 | Bresler | ................ G06T 11/006 |
| 2014/0161355 | A1* | 6/2014 | Wang | .................. G06K 9/4638 |
| | | | | 382/195 |
| 2015/0242463 | A1* | 8/2015 | Lin | ..................... G06F 16/3347 |
| | | | | 707/769 |

(Continued)

FOREIGN PATENT DOCUMENTS

CN          107909120        *   4/2019

*Primary Examiner* — Gabriel I Garcia
(74) *Attorney, Agent, or Firm* — Wayne & Ken, LLC; Tony Hom

(57) ABSTRACT

The present invention discloses a superpixel classification method based on semi-supervised K-SVD and multiscale sparse representation. The method includes carrying out semi-supervised K-SVD dictionary learning on the training samples of a hyperspectral image; using the training samples and the overcomplete dictionary as the input to obtain the multiscale sparse solution of superpixels; and using the obtained sparse representation coefficient matrix and overcomplete dictionary to obtain the result of superpixel classification by residual method and superpixel voting mechanism. The proposing of the present invention is of great significance to solving the problem of salt and pepper noise and the problem of high dimension and small samples in the field of hyperspectral image classification, as well as the problem of how to effectively use space information in classification algorithm based on sparse representation.

10 Claims, 7 Drawing Sheets
(7 of 7 Drawing Sheet(s) Filed in Color)

(56) References Cited

U.S. PATENT DOCUMENTS

2016/0307073 A1\* 10/2016 Moody ................ G06K 9/0063

\* cited by examiner

SUPERPIXEL CLASSIFICATION METHOD BASED ON SEMI-SUPERVISED K-SVD AND MULTISCALE SPARSE REPRESENTATION

CROSS-REFERENCE TO RELATED APPLICATIONS

This application claims priority to Chinese application no. 201810757826.0 with a filing date of Jul. 11, 2018. The content of the aforementioned application, including any intervening amendments thereto, are incorporated herein by reference.

TECHNICAL FIELD

The present invention relates to the field of hyperspectral image classification technology, and in particular to a superpixel classification method based on semi-supervised K-SVD and multiscale sparse representation.

BACKGROUND

Over the years, remote sensing image classification has played an important role in many applications such as environmental damage assessment, crop growth regulation, land use monitoring, urban planning and reconnaissance. Compared with a single-band full-color image and a multi-spectral image, a Hyperspectral Image (HSI) can be used for detecting and distinguishing objects with higher accuracy because HSI has higher spectral resolution.

In a hyperspectral image, the spectral data of each pixel is a high-dimensional vector, and hundreds of data dimensions represent the spectral response of hundreds of bands. Hyperspectral image classification is mainly to classify each pixel based on spectral information. To achieve this goal, many pixel-level classifiers have been developed, including Support Vector Machine (SVM), support vector condition stochastic classifier, neural network, etc. Although these classifiers can make full use of the spectral information of HSI, they have not taken into account the spatial context, so noise often appears in the classification results. To solve this problem, and as a result that the pixels in a local area usually represent the same material and have similar spectral characteristics, many methods to obtain classification effect by integrating the information of near space have been developed. However, due to the lack of understanding of the near area, some risks exist in this kind of rough near area selection. Therefore, object-level classification appeared later. Although ground objects are presegmented in object-level classification, the classification effect is not ideal due to the existence of the problem of undersegmentation.

Inspired by the sparse coding mechanism of human visual system, Bruckstein first proposed the concept of sparse representation. In the field of hyperspectral image classification, the research of sparse representation is mainly focused on the acquisition of overcomplete dictionary and sparse solution:

In the field of sparse representation, the completeness of the sparse representation of the original signal is guaranteed by the overcomplete dictionary. The acquisition methods of the overcomplete dictionary are mainly divided into two types: methods based on mathematical models and methods based on training samples, wherein a dictionary acquisition method based on training samples inherently contains rich original signal characteristics, and direct splicing of the original signal is the most classical overcomplete dictionary based on training samples. However, due to the randomness of training samples and the rigidity of the dictionary, the completeness of the dictionary cannot be verified or improved. Therefore, dictionary learning methods have been proposed, among which, K-SVD dictionary learning method aims to minimize signal reconstruction errors, and dictionary update and sparse coding are carried out alternately through Orthogonal Matching Pursuit (OMP) and Singular Value Decomposition (SVD). Although the K-SVD method has strong universality and popularity, it has not emphasized the characteristics between different classes in the process of classification application.

For the researches on solving the sparse representation of the original signal, the most classic ones are Matching Pursuit (MP) and Orthogonal Matching Pursuit (OMP). In MP and OMP, the solution of sparse representation is based on a signal (pixel) and the influence of spatial context is not considered. Based on this, Joint Sparse Model (JSM) and Synchronous Orthogonal Matching Pursuit (SOMP) appeared subsequently. However, many problems in the selection of near space still exists in these two algorithms: on one hand, the shape of the near space is rectangular, the ground objects in the rectangular window are unknown, and the ground objects in the rectangular window are assumed to be unified in the algorithms, so this assumption becomes very dangerous when the scale is large; on the other hand, the scale of the near space area is single and needs to be set in advance, and different application environments have different optimal scales, so it is very difficult to configure this scale.

Therefore, how to provide a superpixel classification method based on semi-supervised K-SVD and multiscale sparse representation is an urgent problem to be solved by those skilled in the art.

SUMMARY

In view of this, the present invention adopts training sample expansion based on superpixel and coefficient solution based on joint sparse model, introduces superpixel spatial information, and select a near space area that is more consistent with the real ground objects, so the noise in the same ground object is eliminated better and the classification effect is improved effectively.

To achieve the above purpose, the present invention adopts the following technical solution: a superpixel classification method based on semi-supervised K-SVD and multiscale sparse representation, in which software test results are displayed by the monitor, comprising the following steps:

step 1: carrying out semi-supervised K-SVD dictionary learning on the training samples of a hyperspectral image, and thus to obtain an overcomplete dictionary;

step 2: using the training samples and the overcomplete dictionary as the input to obtain the multiscale sparse solution of superpixels, and thus to obtain the sparse representation coefficient matrix of the training samples; step 3, using the obtained sparse representation coefficient matrix and overcomplete dictionary to obtain the result of superpixel classification by residual method and superpixel voting mechanism.

Preferably, the step 1 specifically comprises:

1) using the training samples of the hyperspectral image as the initial dictionary, and denoting the superpixel where the training samples $x_p$ are located as $X_p^{ex}=[x_p^1, \ldots, x_p^{S_p}] \in R^{B \times S_p}$, wherein $S_p$ represents number of pixels contained in the superpixel $X_p^{ex}$, $x_p^s$ ($1 \leq s \leq S_p$) represents an unlabeled sample in the superpixel $X_p^{ex}$; expanding each of the training samples $x_p$ to obtain a new training sample set $$X^{ex}[X_1^{ex}, \ldots, X_P^{ex}] \in R^{B \times P^{ex}}$$

wherein $P^{ex} = \sum_{p=1}^{P} S_p$ represents the total number of the new samples;

2) each of the training samples $x_p$ having a corresponding label $l_p$ ($1 \leq l_p \leq U$), wherein U is the number of classes, and except that the training samples $x_p$ have labels $l_p$, the labels of other samples in the superpixel $X_p^{ex}$ are regarded as $l_p$.

Preferably, a joint sparse model is adopted in the step 2 to obtain the sparse solution during sparse dictionary learning process, which specifically comprises:

1) assuming all samples with labels $X^{ex}$ in the new training sample set $X^{ex}$ as one set, wherein $1 \leq u \leq U$, $$X_u = [x_1, \ldots, x_c, \ldots, x_{C_u}] \in R^{B \times C_u}$$

$X_u$ is a $B \times C_u$ matrix and represents a set composed of $C_u$ pixels, the set is a set of all samples with labels u in $X^{ex}$, and each pixel $x_c$ contains B spectral layers, wherein $1 \leq c \leq C_u$; the set satisfies that $$\{X_u\}_1^P = \{X_u \subseteq X^{ex} | L(X_u) = u\}$$

wherein $L(X_u)$ represents a function for obtaining $X_u$ labels;

2) for a plurality of pixels in basically the same class of ground object materials, regarding the plurality of pixels as locally smooth and sparse areas;

3) sharing a common sparse mode by $X_u$ of the same class of labels, and then $C_p$ pixels can approximate the sparse representation through the atomic combination of the overcomplete dictionary:

$$X_u = [x_1, \ldots, x_c, \ldots x_{C_u}] \approx D[a_1, \ldots a_{C_u}]$$

wherein $D \in R^{B \times N_D}$ is the overcomplete dictionary with $N_D$ atoms and labels corresponding to each atom, and the atoms are the column vectors in the overcomplete dictionary D;

$A_u \in R^{N_D \times C_P}$ is the matrix of sparse coefficient $[a_1, \ldots, a_{C_u}]$; due to local smoothness and sparsity, all sparse coefficient vectors $\{a_c\}_1^{C_u}$ are assumed to have the same non-zero row position if $A_u$ has only $L_C$ ($L_C \ll N_D$) non-zero rows therein;

4) solving $A_u$ by solving the joint sparse recovery problem:

$$\widehat{A_u} = \arg\min_A \|X_u - DA_u\|_2^2,$$

$$\|A_u\|_{row,0} \leq L_C$$

wherein $\|A_u\|_{row,0}$ is $l_0$ norm obtained by rows, and is the number of non-zero rows of $A_u$.

Preferably, the joint sparse recovery problem is solved by orthogonal matching pursuit, and at this point, the overcomplete dictionary D is normalized by columns to make the $l_2$ norm unitized.

Preferably, the step 3 specifically comprises:

1) giving a test pixel $y_1$ in a hyperspectral image, selecting T adjacent areas of different scales/dimensions, and arranging the pixels in the selected area to construct the corresponding multiscale matrix $Y^{multiscale} = [Y_1, \ldots, Y_t, \ldots, Y_T]$, wherein $Y_t$ includes the pixels from the $t^{th}$ scale area;

2) rewritting the sparse representation problem of T scales as $$\{\hat{A}\}_{t=1}^T = \arg\min_{\{A_t\}} \sum_{t=1}^{T} \|Y_t - DA_t\|_F$$

$$\|A_t\|_{row,0} \leq K \forall 1 \leq t \leq T$$

wherein $[A_1, \ldots, A_t, \ldots, A_T]$ is the sparse coefficient of $[Y_1, \ldots, Y_t, \ldots, Y_T]$, which constitutes the multiscale sparse representation matrix $A^{multiscale}$;

3) creating an adaptive set $L_h$, wherein $h = 1, 2, \ldots$ is expressed as the index of a set of non-zero scalar coefficients and belongs to the same class in the multiscale sparse representation matrix $A^{multiscale}$; for columns in each scale of $A^{multiscale}$, indexes of adaptive set $L_h$ are in the same row;

4) determining the class of the test pixel $y_1$ based on the minimum total representing error $$\hat{c} = \arg\min_c \left\| Y^{multiscale} - D_c \hat{A}_c^{multiscale} \right\|_F$$

$\hat{A}_c^{multiscale}$ represents the row corresponding to class c in $\hat{A}^{multiscale}$.

Preferably, the sparse representation problem of T scales is solved by orthogonal matching pursuit.

Preferably, the steps to select the adaptive set in step 3) are as follows:

(1) finding a representing atom with the minimum residual error for each scale of each class;

(2) combining the optimum atoms of all scales of each class into a cluster;

(3) selecting the optimum cluster from clusters of all the classes and recording the index of atoms in the cluster as the adaptive set.

Preferably, to combine and classify the information of different scales, the joint sparse constraint $l_{row,0}$ is applied to solve the multiscale sparse representation matrix $A^{multiscale}$, which enables the sparse coefficients of different scales share the same sparse mode, i.e., the same atom set is selected to represent pixels of different scales; at this point, $A^{multiscale}$ is jointly restored by solving the following problem:

$$\hat{A}^{multiscale} = \arg\min_{A^{multiscale}} \|Y^{multiscale} - DA^{multiscale}\|_F$$

$$\|A^{multiscale}\|_{row,0} \leq K$$

Preferably, the sparse coefficient required by the multiscale pixel need to be beneficial to the sparse mode of the same class level, but at the same time sparse modes of different scale levels are allowed within each class.

Preferably, the method further comprises the following step after determining the class of the test pixel $y_1$ in step 4): performing the superpixel voting process once again by using the superpixels with the least scale.

It is known from the above technical solution that the present invention provides a superpixel classification method based on semi-supervised K-SVD and multiscale sparse representation, having the following beneficial effects:

The present invention has good capacity to remove salt and pepper noise and enrich training samples;

The present invention can provide very stable classification results in the condition with various sample sizes, and with the enrichment of samples, the classification method provided by the invention has higher and higher classification performance;

The proposing of the method is of great significance to solving the problem of salt and pepper noise and the problem of high dimension and small samples in the field of hyperspectral image classification, as well as the problem of how to effectively use space information in classification algorithm based on sparse representation.

DESCRIPTION OF DRAWINGS

The application file contains at least one drawing executed in color. Copies of this patent application publication with color drawing(s) will be provided by the Office upon request and payment of the necessary fee.

As the color drawings are being filed electronically via EFS-Web, only one set of the drawings is submitted.

The requisite fee for this Petition has been payed.

To more clearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

Figure 2:
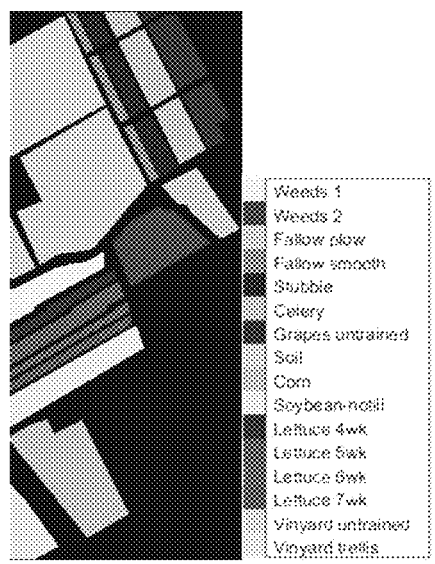
Figure 3:
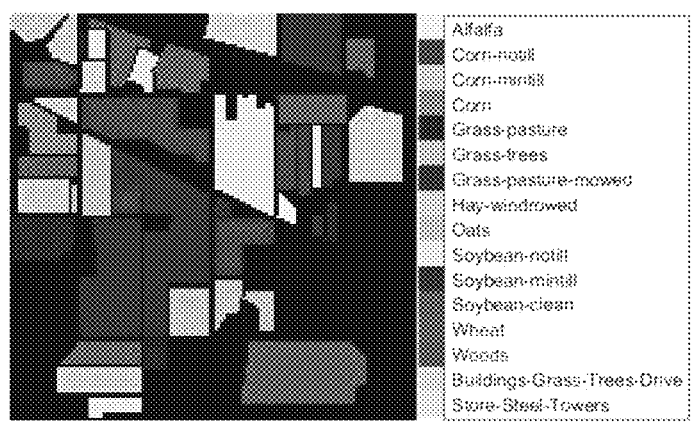
Figure 4:
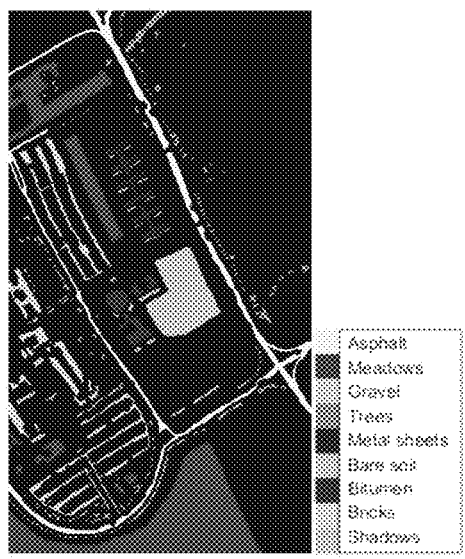
Figure 5:
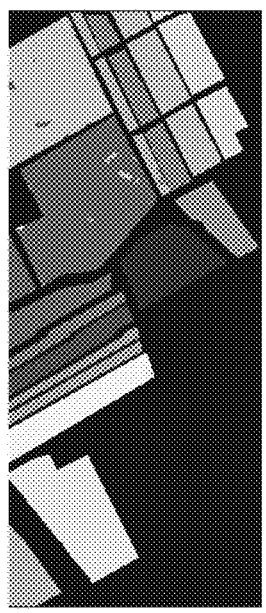
Figure 6:
Figure 7:
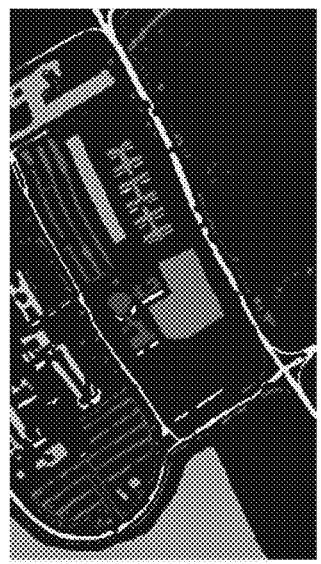

FIG. 1($a$) is a diagram of the effect of solving multiscale sparse representation matrix by SOMP model in the present invention;

FIG. 1($b$) is a diagram of the effect of solving multiscale sparse representation matrix by Strict Joint Sparse Model in the present invention;

FIG. 1($c$) is a diagram of the effect of solving multiscale sparse representation matrix by Flexible Joint Sparse Model in the present invention;

FIG. 2 is the ground truth of the embodiment of Salinas data set;

FIG. 3 is the ground truth of the embodiment of Indian pines data set;

FIG. 4 is the ground truth of the embodiment of Pavia University data set;

FIG. 5 is a schematic diagram of the actual classification result of SK-MSR algorithm on Salinas in the present invention;

FIG. 6 is a schematic diagram of the actual classification result of SK-MSR algorithm on Indian Pines in the present invention; and FIG. 7 is a schematic diagram of the actual classification result of SK-MSR algorithm on Pavia University in the present invention.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

The algorithm of the present invention comprises two parts: semi-supervised K-SVD dictionary learning algorithm and multiscale sparse representation solution based on superpixels. Firstly, the training samples of a hyperspectral image are given for semi-supervised K-SVD dictionary learning, and thus to obtain an overcomplete dictionary with distinct characteristics; secondly, test samples and the overcomplete dictionary are taken as the input to introduce the algorithm of multiscale sparse representation solution of superpixel spatial information, and thus to obtain the sparse representation coefficient matrix of the test samples; finally, the obtained sparse representation coefficient matrix and overcomplete dictionary are used to obtain the final result of superpixel classification by residual method and superpixel voting mechanism.

1.1 Traditional K-SVD Dictionary Learning Method

In K-SVD algorithm, we need a dictionary D composed of unitized atoms and the sparse representation coefficient of a signal relative to the current dictionary, and we hope to minimize the reconstruction errors in each update:

$$\{\hat{D}, \hat{A}^{train}\} = \arg\min \|X^{train} - DA^{train}\|_2^2, \text{ s.t.} \quad (1)$$
$$\|a_p^{train}\|_0 \leq L_D$$

$$p = 1, \ldots, P,$$

wherein $D = [d_1, \ldots, d_{N_D}] \in R^{B \times N_D}$ is the dictionary with $N_D$ atoms to be learned; $X^{train} = [x^{train}_1, \ldots, x^{train}_P] \in R^{B \times P}$ is a training sample set containing P training samples; $A^{train} = [a_1^{train}, \ldots, a_P^{train}] \in R^{N_D \times P}$ is the sparse representation matrix corresponding to $X^{train}$, and $L_D(L_D \ll N_D)$ is the upper boundary of model sparsity. K-SVD is composed of a sparse coding stage and a dictionary update stage: firstly, the sparse representation matrix $A^{train}$ in formula (1) is solved by fixed dictionary D and OMP algorithm.

The second stage is started once $A^{train}$ is obtained, all the other atoms in the dictionary are fixed, the current atom is updated by SVD decomposition of error terms, and the second stage is ended when all the atoms in the dictionary are updated. Assume that the $k^{th}$ column of atoms are currently updated, denote the $k^{th}$ column as $d_k$, and denote the corresponding $k^{th}$ row in the sparse matrix $A^{train}$ as $a_T^k$, so the sample matrix and dictionary approximation error after $d_k a_T^k$ is removed is $$\|X^{train} - DA^{train}\|_F^2 = \left\|X^{train} - \sum_{j=1}^{N_D} d_j a_T^j\right\|_F^2 = \quad (2)$$
$$\left\|\left(X^{train} - \sum_{j \neq k}^{N_D} d_j a_T^j\right) - d_k a_T^k\right\|_F^2 = \|E_k - d_k a_T^k\|_F^2$$

After the current error $E_k$ is obtained, we only need to adjust $d_k$ and $a_T^k$ to make the error between the product thereof and $E_k$ small enough. To ensure sparsity, we only extract non-zero terms from $a_T^k$ to constitute the column vector $a_R^k$, record the indexes of the columns of $a_T^k$ non-zero terms, extract corresponding column vectors from $E_k$ according to the indexes to constitute matrix $E_k^R$, perform SVD decomposition of $E_k^R$ to obtain $E_k^R = U \Delta V^T$, update $d_k$ by using the first column of U, and update $a_R^k$ by using the result of $\Delta(1,1) \times V$.

These two stages are iterated until certain stopping criteria are met.

1.2 Semi-Supervised K-SVD Dictionary Learning Method

Two problems are found in applying the traditional K-SVD algorithm to hyperspectral image classification: on one hand, in K-SVD algorithm, training samples are limited to the total number of original samples, sufficient information is not available for small sample classes, but the number of labeled samples is limited, so how to effectively increase the number of training samples is worth studying; on the other hand, the concept of class does not exist in K-SVD algorithm, and how to enlarge the properties of each class by sparse representation is a major research topic in the field of sparse representation.

To solve these two problems, we expand the training samples of K-SVD algorithm based on superpixels, and expand the K-SVD algorithm without supervised learning to the semi-supervised K-SVD algorithm; and optimize OMP solution method during dictionary update to a solution method based on Joint Sparse Model (JSM).

1.2.1 Training Sample Expansion Based on Superpixels

For the K-SVD method, both the training samples and the initial dictionary are original training samples. However, for a hyperspectral image, the numbers of labeled samples in different classes are different or even vary greatly from the each other; therefore, small sample classes usually have the problem of insufficient samples. To avoid this problem without increasing labeled training samples, we use a semi-supervised strategy to expand the training samples based on superpixels.

The scale of superpixel segmentation is different from that of traditional object-level segmentation; compared with the target of capturing a complete ground object, the superpixel focuses more on one part of the ground object accurately, and then covers the whole ground object completely through the combination of several superpixels. Such excessive segmentation scale enables a single segmentation area (superpixel) to more accurately match the boundary of the ground object locally. Therefore, for an ideal superpixel, we can assume that all of the pixels therein belong to the same ground object.

If the original training sample is $X^{train}=[x_1^{train}, \ldots, x_P^{train}] \in R^{B \times P}$, P training samples (pixels) $x_p$ ($1 \le p \le P$) are included, and B spectral layers contained in each pixel $x_p$ are expressed by the B dimensional vector. Each of the training samples has a corresponding label $l_p$ ($1 \le l_p \le U$), wherein U is the number of classes; therefore, the label set is $L^{train}=[l_1^{train}, \ldots, l_P^{train}] \in R^P$. The training samples and labels thereof are the basis for final classification, in other words, how to obtain a better classification result on the basis of limited number of labeled training samples is the objective of the study.

To prevent the atomic number of the dictionary from being out of control, the original training samples are used as the initial dictionary. However, new training samples will be added as the final training samples. The superpixel where the training samples $x_p$ are located is denoted as $X_p^{ex}=[x_p^1, \ldots, x_p^{S_p}] \in R^{B \times S_p}$, wherein $S_p$ represents number of pixels contained in the superpixel $X_p^{ex}$, and $x_p^s$ ($1 \le s \le S_p$) represents an unlabeled sample (pixel) in the superpixel. By expanding each training sample $x_p$, a new training sample set is obtained:

$$X^{ex}=[X_1^{ex}, \ldots, X_P^{ex}] \in R^{B \times P^{ex}} \quad (3)$$

wherein $P^{ex}=\sum_{p=1}^{P} S_p$ is the total number of the new samples. As mentioned before, except that original training samples $x_p$ have labels $l_p$, the labels of other samples in the superpixel can be regarded as $l_p$. Therefore, without increasing the number of labeled training samples, the number of training samples can be greatly increased by the semi-supervised policy of introducing a great number of unlabeled samples whose classes can be deduced.

1.2.2 Sparse Solution Based on Joint Sparse Model

In the K-SVD algorithm, we need to obtain a new sparse representation according to the new dictionary after each update of the dictionary completes, but the OMP algorithm used by K-SVD does not have a concept of classification, and the sparse solution processes of samples of the same class are isolated from one another. However, in the field of classification of sparse representations, ideal sparse representations of samples of the same class shall be highly similar, and therefore, the Joint Sparse Model (JSM) is introduced for the sparse solution during the dictionary learning process. The solution process is as follows.

Taking class $u$ ($1 \le u \le U$) as an example, we arrange all the samples with labels u in $X^{ex}$ into one set $$X_u=[x_1, \ldots, x_c, \ldots, x_{C_u}] \in R^{B \times C_u} \quad (4)$$

$X_u$ is a $B \times C_u$ matrix and represents a set composed of $C_u$ pixels, the set is a set of all samples with labels u in $X^{ex}$, and each pixel $x_c$ ($1 \le c \le C_u$) contains B spectral layers. Therefore, the set satisfies $$\{X_u\}_1^P=\{X_u \subseteq X^{ex} | L(X_u)=u\} \quad (5)$$

wherein $L(X_u)$ represents a function for obtaining $X_u$ labels. In an HSI, when a plurality of pixels have basically the same class of ground object materials, the plurality of pixels can be regarded as locally smooth and sparse areas. With the JSM concept, we make $X_u$ with the same class of labels share a common sparse mode. $C_p$ pixels can approximate the sparse representation through the atomic combination of the given dictionary:

$$X_u=[x_1, \ldots, x_c, \ldots, x_{C_u}] \approx D[a_1, \ldots, a_{C_u}] \quad (6)$$

wherein $D \in R^{B \times N_D}$ is a dictionary with $N_D$ atoms and labels corresponding to each atom, the atoms are column vectors in the overcomplete dictionary D, for example, $a_1=[1,0,0,0,0 \ldots, 1]$ in formula (6), $x_1$ is the combination of the first atom and the last atom in the overcomplete dictionary D.

$A_u \in R^{N_D \times C_p}$ is the matrix of sparse coefficient $[a_1, \ldots, a_{C_u}]$. Due to local smoothness and sparsity, it can be assumed that $A_u$ has only $L_C$ ($L_C \ll N_D$) non-zero rows. The Joint Sparse Model (JSM) indicates that all sparse coefficient vectors $\{a_c\}_1^{C_u}$ have the same non-zero row position.

The JSM solution $A_u$ is achieved by solving the joint sparse recovery problem:

$$\tilde{A_u} = \arg\min_A \|X_u - DA_u\|_2^2, \quad (7)$$

$$\|A_u\|_{row,0} \le L_C$$

wherein $\|A_u\|_{row,0}$ is the $l_0$ norm obtained by rows, and is the number of non-zero rows of $A_u$. This problem can be solved by Synchronous Orthogonal Matching Pursuit (SOMP). When the problem is solved by SOMP, the dictionary D is normalized by columns to make the $l_2$ norm unitized.

1.2.3 Semi-Supervised K-SVD Implementation Process

In the traditional K-SVD algorithm, the label of the training sample is not used, and the update of the dictionary only focuses on how to obtain a smaller error in each column. The semi-supervised K-SVD algorithm herein uses the semi-supervised learning policy: first, obtaining expanded training samples by using the same assumption of the same superpixel label on the basis of the fundamental training sample; and then implementing the means of obtaining a joint sparse representation matrix for each class of expanded training samples to use the labels of training samples and a great number of unlabeled samples during the learning of the dictionary.

Herein, we present a complete learning process of the semi-supervised K-SVD dictionary in the form of pseudo-codes.

---

Algorithm 1:

---

Input: Training sample set $X^{train} = [x_1^{train}, ..., x_P^{train}]$, training sample label set $L^{train} = [l_1^{train}, ..., l_P^{train}]$, superpixel split image, structured dictionary atomic number $N_D$, sparseness S, degree of learning K, and the number of classes U.
    Output: Sparse representation $A^{ex}$, and the final structured dictionary D.
    load Superpixel split image
    The initialized dictionary D is the $X^{train}$ whose $l_2$ norm is unitized
    Obtain the expanded training sample $X^{ex}$ according to the superpixel split image as shown in formula (3)
    for iter=0; iter<K; iter ++
    //Fixed dictionary D, the process of obtaining the current sparse representation matrix $A_u$ is as follows
        for u=1;u≤ U;u++
            Obtain the set $X_u = [x_1, ..., x_c, ..., x_{C_u}]$ of all pixels of class u in $X^{ex}$ to meet the formula (5)
            Obtain the joint sparse representation matrix $A_u$ of class u by using the SOMP method according to the sparseness S to meet the formula (6)
        end For
    //Fixed sparse representation matrix $A_u$, and the process of updating the dictionary D is as follows
        loop Traverse each atom (column) of D, and the current atom is $d_k (1 \leq k \leq N_D)$
            Obtain the error matrix $E_k$ of the current column according to the formula (2)
            Extract non-zero terms from $a_T^k$ to constitute the column vector $a_R^k$, and record the indexes of columns of $a_T^k$ non-zero terms
            Extract corresponding column vectors from $E_k$ according to the indexes to constitute matrix $E_k^R$
            Perform SVD decomposition of $E_k^R$ to obtain $E_k^R = U\Delta V^T$
            Update $d_k$ from the first column of U, and update $a_R^k$ by using the result of $\Delta(1,1) \times V$
        end loop $d_k$
    end for

---

2 Superpixel Classification Algorithm of Multiscale Sparse Representation

Unlike the sparse solution of the training sample in the learning process of dictionary, the sparse solution of the test sample shall be performed in a more cautious and stable way, and a more purposive design is needed. The practical SOMP algorithm described above takes the pixels in the near space (preset 3×3, 5×5 or 7×7 area) of the target pixel into account in the process of sparse solution, and the prior art solves the problem of fixed and single SOMP area and proposes a multiscale SOMP method. The method jointly considers pixels in multiscale near space of the target pixel (e.g., joint use of near space of three scales: 3×3, 5×5 and 7×7) to obtain more stable and abundant space context information. However, the problem of hidebound selection of near space remains unsolved, and therefore, we design the superpixel classification algorithm of multiscale sparse representation that is closer to actual ground object, has smaller noise and uses the superpixel space information.

First, we usually can obtain superpixel split images of three scales that each superpixel contains an average of about 16, 64 and 256 pixels by using the existing superpixel split algorithm. In these images, images with small pixels (a small number of pixels) provides a more accurate local coverage for the ground object, and images with large pixels (a large number of pixels) can contain more abundant space context. It is found by experiment that the scale span of superpixel is larger than the rectangular window. The single use of superpixel as the spatial information leads to a less-than-ideal result due to too few auxiliary areas, and single use of rectangular window can result in unknown risk of ground object. Therefore, we decide to cross use the two space scales to obtain the most accurate and abundant space information.

By giving a test pixel $y_1$ in HSI and selecting T adjacent areas of different scales (dimensions), pixels in the selected area can be arranged to construct the corresponding multi-scale matrix $Y^{multiscale} = [Y_1, \ldots, Y_t, \ldots, Y_T]$, wherein $Y_t$ includes the pixels from scale area t. In hyperspectral images, areas of different sizes often exhibit different spatial structures and features. However, because all different scales correspond to the same test pixel $y_1$, supplementary and pertinent information shall be provided to classify the $y_1$ more accurately.

Figure 1A:
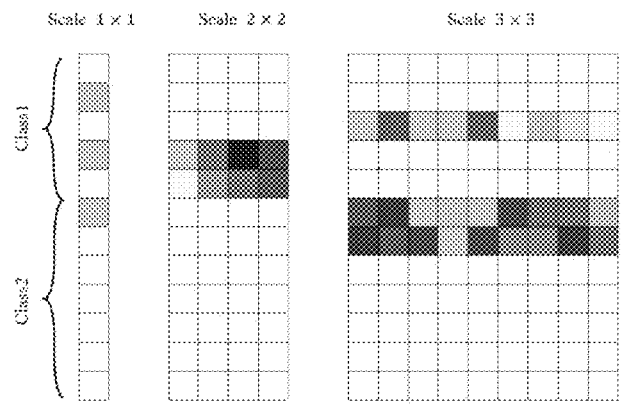
Figure 1B:
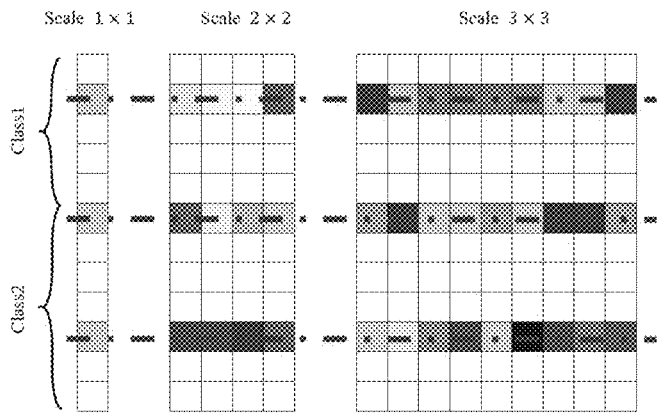

It is assumed that we have a structure dictionary D and a multiscale matrix $[Y_1, \ldots, Y_t, \ldots, Y_T]$ for the test pixel $y_1$. Then the sparse representation problem of T scales can be rewritten as $$\{\hat{A}\}_{t=1}^T = \arg\min_{\{A_t\}} \sum_{t=1}^T \|Y_t - DA_t\|_F \quad (8)$$

$$\|A_t\|_{row,0} \leq K \forall\, 1 \leq t \leq T$$

wherein $[A_1, \ldots, A_t, \ldots, A_T]$ is the sparse coefficient of $[Y_1, \ldots, Y_t, \ldots, Y_T]$, which can constitute the multiscale sparse representation matrix $A^{multiscale}$. FIG. 1 of the Description shows the principle diagrams of three kinds of sparse models, and this problem can be solved by applying the SOMP algorithm at every scale. See FIG. 1(a). However, such separate policy does not consider the strong relevance among different scales. To combine and classify the information of different scales, the joint sparse constraint $l_{row,0}$ can also be applied to the multiscale sparse representation matrix $A^{multiscale}$, which guarantees that the sparse coefficients of different scales share the same sparse mode, i.e., the same atom set is selected to represent pixels of different scales. See FIG. 1(b). Under this assumption, $A^{multiscale}$ can be jointly restored by solving the following problem:

$$\hat{A}^{multiscale} = \arg\min_{A^{multiscale}} \|Y^{multiscale} - DA^{multiscale}\|_F \quad (9)$$

$$\|A^{multiscale}\|_{row,0} \leq K$$

The above-mentioned joint method can mix information coming from different scales for classification. However, it is assumed that pixels of all scales are of the same sparse mode, but because structure features of different scales of HSI differ from one another, the restriction is too strong. In other words, to obtain a better representation, pixels from each scale must have "freedom" to select different suitable atoms. Furthermore, because all the multiscale information corresponds to the same test pixel $y_1$, the "freedom" of selecting the atoms shall be confined to one level. Therefore, the sparse coefficient required by the multiscale pixel shall be beneficial to the sparse mode of the same class level, but at the same time sparse modes of different scale levels are allowed within each class.

Figure 1C:
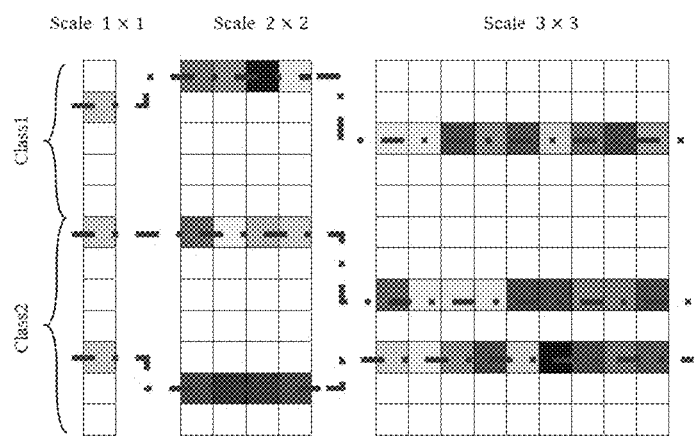

According to the above thought, a flexible model is adopted herein. The model achieves the flexible selection process of atoms by introducing an adaptive sparse policy. An important part of this policy is the adoption of adaptive set. For each adaptive set $L_h$, h=1, 2, . . . is expressed as the index of a set of non-zero scalar coefficients, belonging to the same class in the multiscale sparse matrix $A^{multiscale}$. For columns in each scale of $A^{multiscale}$ indexes of adaptive set $L_h$ are in the same row. This is achieved by applying joint sparse regularization to pixels within each proportion. In addition, $L_h$ at different scales can be in different rows. This means that pixels at different scales can freely select different atoms of each class. In this way, sparse coefficients of different scales can vary but still belong to the same class as shown in FIG. 1(c).

By combining the adaptive set and the $l_{row, 0}$ norm, a new adaptive norm $l_{adaptive, 0}$ is created on the $A^{multiscale}$, which can select a few adaptive sets from $A^{multiscale}$. Then, $A^{multiscale}$ matrix can be obtained through the adaptive norm $l_{adaptive, 0}$, i.e., $$\hat{A}^{multiscale} = \arg\min_{A^{multiscale}} \|Y^{multiscale} - DA^{multiscale}\|_F \quad (10)$$

$$\|A^{multiscale}\|_{adaptive,0} \leq K$$

To solve the problem with formula (10), the multiscale SOMP algorithm is used.

The biggest difference between the multiscale SOMP algorithm and the OMP and SOMP is how to select a new adaptive set. In the multiscale SOMP algorithm, it is hoped that the selected adaptive set shall meet the following requirements: 1. the ordinal number of rows in which each column of non-zero terms of adaptive subsets of the same scale exists shall be the same; 2. the number of non-zero rows of adaptive subsets of different scales in the same class shall be the same. See FIG. 1(c).

To achieve this, according to FIG. 1(c), the steps in selecting a new adaptive set are as follows: 1) finding a representing atom with the minimum residual error for each scale of each class; 2) combining the optimum atoms of all scales of each class into a cluster; 3) selecting the optimum cluster from clusters of all the classes and recording the index of atoms in the cluster as the new adaptive set.

After the multiscale sparse representation matrix $A^{multiscale}$ is obtained, the class of the test pixel $y_1$ can be determined based on the minimum total representing error.

$$\hat{c} = \arg\min_{c} \left\| Y^{multiscale} - D_c \hat{A}_c^{multiscale} \right\|_F \quad (11)$$

$\hat{A}_c^{multiscale}$ represents the row corresponding to class c in $\hat{A}^{multiscale}$.

So far at this moment, the classification result of HSI sparse representation in pixels can be obtained. However, because the data dimension of spectral information is too high, the classification at the pixel level usually has certain salt and pepper noise interference. To further smooth the classification result and improve the classification accuracy, this algorithm will perform the superpixel voting process once again by using the superpixels with the least scale.

Taking superpixel $S_1$ as an example, because the randomness of allocation of training samples and test samples, each superpixel may contain these two kinds of samples, the superpixel $S_1$ containing M training samples and N test samples can be expressed as $$S_1 = [s_1, \ldots, s_M, s_{M+1}, \ldots, s_{M+N}] = \quad (12)$$
$$[x_{s_1}, \ldots, x_{s_M}, y_{s_{M+1}}, \ldots, y_{s_{M+N}}] \in R^{B \times (M+N)}$$

wherein 其中 $s_i$ ($1 \leq i \leq M+N$) is a certain pixel of the superpixel; when $s_i$ is the training sample, $s_i = x_{s_i}$ ($1 \leq i \leq M$); and when $s_i$ is the test sample, $s_i = y_{s_i}$ ($M+1 \leq i \leq M+N$). The label set of the superpixel is $$L_1 = [l_1, \ldots, l_M, l_{M+1}, \ldots, l_N] \in R^N \quad (13)$$

Similarly, $l_i$ ($1 \leq i \leq M+N$) is the label of pixel $s_i$; when $s_i$ is the training sample, $l_i$ is the real ground object label of $x_{s_i}$; and when $s_i$ is the test sample, $l_i$ is the original classification result of $y_{s_i}$.

Based on the assumption that all pixels within the superpixel belong to the same ground object, the classification result of all the test samples is obtained once again by voting, and the method is as follows:

$$\{l_i\}_{M+1}^{M+N} = l_{maxnum} = \text{maxnum}(L_1) \quad (14)$$

wherein the function maxnum($L_1$) is used to obtain the label value $l_{maxnum}$ that occurs most often in the $L_1$ vector. The final superpixel classification algorithm of multiscale sparse representation is obtained.

We provide the process of complete superpixel classification including the dictionary learning in the form of pseudocodes.

---

Algorithm 2

---

Input: Training sample set $X^{train} = [x_1^{train}, \ldots, x_P^{train}]$, training sample label set $L^{train} = [l_1^{train}, \ldots, l_P^{train}]$, superpixel split image, structured dictionary atomic number $N_D$, sparseness S, degree of learning K, the number of classes U, test sample set $Y^{test} = [y_1^{test}, \ldots, y_P^{test}]$, the -continued Algorithm 2 scale number of multiscale Nm, and various scale allocation standards (rectangular window/superpixel).
    Output: Final classification result
    //Learning process of semi-supervised K-SVD dictionary
    According to the algorithm 1, the training sample set $X^{train}$, training sample label set $L^{train}$, superpixel split image, structured dictionary atomic number $N_D$, sparseness S, degree of learning K, and the number of classes U are used as the input to obtain the overcomplete dictionary D.
    //Improved multiscale sparse solution process of superpixels
    load Superpixel split image to obtain all superpixel labels of the image
    loop Traverse all test samples, and the current test sample is $y_j$
        for t=1; t≤ Nm;t++
            Obtain $Y_t$ according to the respective scale allocation standard
        end for
        Obtain $Y^{multiscale} = [Y_1, ..., Y_t, ..., Y_T]$
        Obtain the multiscale sparse representation $A^{multiscale}$ according to the formula (10)
        Obtain the classification result of $y_j$ according to the formula (11)
    end loop Test sample $y_j$
    //Superpixel classification process based on superpixel voting
    loop Traverse all the superpixels, and the current superpixel is $S_j$
        Obtain all the pixel information of superpixel $S_j$ according to the formula (12)
        Obtain the label set $L_j$ of $S_j$ according to the formula (13)
        Obtain the maximum number label value $l_{maxnum}$ in the superpixel $S_j$ according to the formula (14)
        loop Traverse all test samples in the superpixel $S_j$, and the current test sample is $y_k$
            $l_k = l_{maxnum}$
        endloop Test sample $y_k$
    end loop Superpixel $S_j$

3. Experiment and Result Analysis

To verify the effectiveness and generality of the algorithm, the performance contrast experiment is performed on three data sets including Salinas, Indian Pines and Pavia University. Through objective measures of OA, AA and Kappa coefficient, the target algorithm is compared with various classic or advanced algorithms mentioned herein to obtain the objective evaluation of the proposed algorithm.

The hardware platform for the experiment is: Intel core i5-6300HQ CPU, and 4 GB memory. The target algorithm, the comparison algorithm, and the calculation of OA, AA and Kappa coefficient are all realized with codes by using the matlab 2014a Community Edition.

3.1 Data Set

The Salinas data set is collected by the AVIRIS sensor from the Salinas Valley of California. The image dimension is 512*217*224, and the spatial resolution is 3.7 meters per pixel. Similar to the Indian pines data set, 20 spectral bands absorbed by the water bodies are removed (S/N: 108-112, 154-167 and 224), and the reference image has 16 different classes. The real information of the ground object is shown in FIG. 2.

The Indian pines data set is obtained by Airborne Visible/Infrared Imaging Spectrometer (AVIRIS) sensor system over the Indian pines test station at northwest Indiana of the United States. The data size is 145×145 pixels, the image contains 200 pieces of wave band spectral information after the noise wave band is removed, and the resolution is 20 m. The real ground object has 16 marked areas, and the real information of the ground object is shown in FIG. 3.

ROSIS-03 sensor records the Pavia University data set which captures the urban area surrounding the Pavia University of Italy. The image dimension is 610*340*115, the spatial resolution is 1.3 meters per pixel, and the spectral coverage range is 0.43 to 0.86 micrometer. The data set abandons 12 very noisy passages, and marks 9 information classes for this image. The real information of the ground object is shown in FIG. 4.

3.2 Evaluation Indexes of Algorithm

Three objective indexes (i.e., overall accuracy (OA), average accuracy (AA) and Kappa coefficient) are used during the experiment to evaluate the quality of classification results. OA measures the percentage of correctly classified pixels. AA represents the mean value of percentages of correctly classified pixels of various classes. Kappa coefficient estimates the proportion of correctly classified pixels via the confusion matrix.

3.3 Performance Contrast Experiment

In the contrast experiment of the three data sets, a scale allocation standard needs to be set for the target algorithm. Eventually, 8 layers of scale space are set for $Y^{multiscale}$ including, from small to large, 3×3 rectangular frames, superpixels with an average of 16 pixels, 7×7 rectangular frames, superpixels with an average of 64 pixels, 11×11 rectangular frames, 13×13 rectangular frames, 15×15 rectangular frames, and superpixels with an average of 256 pixels. The sparseness S=10, and degree of learning K=5. The reference contrast algorithm is set according to the recommended algorithm parameter.

To fully verify the effectiveness of the algorithm, the contrast algorithms selected include JSM, non-local weighted sparse representation (NLW-SR), single-scale adaptive sparse representation (SASR), multiscale separation sparse representation (MSSR), multiscale rigid joint sparse representation (MJSR) and multiscale flexible joint sparse representation (MASK),wherein the SASR, MSSR and MJSR algorithms are sparse solving algorithms of multiple joint sparse models mentioned in the MASK algorithm literature.

To verify the performance of algorithm on different sample quantities, the Salinas, Indian Pines and Pavia University data sets are respectively used to imitate the situations with normal sample quantity, less sample quantity and adequate sample quantity.

In the Salinas data set, due to the adequate sample quantity, only 1% of all the marked pixels are randomly selected as the training samples, and remaining 99% pixels are used as test samples, and the actual allocation of sample quantities is shown in Table 1.

TABLE 1

Salinas Sample Allocation

| Class | Name | Train | Test |
|---|---|---|---|
| 1 | Weeds 1 | 20 | 1989 |
| 2 | Weeds 2 | 37 | 3689 |
| 3 | Fallow | 20 | 1956 |
| 4 | Fallowplow | 14 | 1380 |
| 5 | Fallow smooth | 27 | 2651 |
| 6 | Stubble | 30 | 3919 |
| 7 | Celery | 36 | 3543 |
| 8 | Grapes | 113 | 11158 |
| 9 | Soil | 62 | 6141 |
| 10 | Corn | 33 | 3245 |
| 11 | Lettuce 4 wk | 11 | 1057 |
| 12 | Lettuce 5 wk | 19 | 1908 |
| 13 | Lettuce 6 wk | 9 | 907 |
| 14 | Lettuce 7 wk | 11 | 1059 |
| 15 | Vinyard untrained | 73 | 7195 |
| 16 | Vineyardtrellis | 18 | 1789 |
| | Total | 543 | 53586 |

It can be seen from Table 1 that in the Salinas data set, the quantity of samples of different classes is small, and the samples are evenly distributed. To verify the advantages of the SK-MSR algorithm provided herein on the small set of samples, fewer training samples are selected for the test.

TABLE 2

Salinas Classification Results

| Class | JSM | NLW-SR | SASR | MSSR | MJSR | MASR | SK-MSR |
|---|---|---|---|---|---|---|---|
| 1 | 94.20 | 99.99 | 99.68 | 100 | 99.89 | 100 | 100 |
| 2 | 94.56 | 99.78 | 100 | 99.94 | 99.70 | 99.71 | 100 |
| 3 | 93.25 | 98.69 | 99.65 | 97.29 | 97.60 | 98.36 | 99.08 |
| 4 | 91.13 | 98.40 | 86.67 | 98.12 | 99.13 | 99.41 | 94.49 |
| 5 | 93.50 | 98.76 | 88.40 | 95.17 | 99.63 | 99.06 | 99.28 |
| 6 | 94.15 | 99.85 | 94.44 | 99.78 | 99.99 | 100 | 99.90 |
| 7 | 78.00 | 99.76 | 98.16 | 99.66 | 99.97 | 99.93 | 99.60 |
| 8 | 99.36 | 89.88 | 94.96 | 91.56 | 85.33 | 95.18 | 98.74 |
| 9 | 18.05 | 99.91 | 99.99 | 100 | 99.84 | 99.93 | 99.83 |
| 10 | 92.65 | 95.87 | 94.97 | 97.90 | 96.11 | 97.06 | 97.19 |
| 11 | 97.00 | 99.85 | 94.76 | 99.12 | 99.82 | 99.91 | 98.29 |
| 12 | 89.18 | 99.58 | 88.42 | 97.27 | 99.98 | 99.91 | 99.68 |
| 13 | 88.24 | 97.86 | 86.03 | 94.97 | 99.60 | 99.76 | 99.89 |
| 14 | 98.09 | 94.83 | 85.48 | 95.41 | 98.07 | 98.56 | 99.24 |
| 15 | 95.06 | 84.97 | 92.93 | 89.38 | 77.74 | 90.53 | 97.76 |
| 16 | 76.78 | 99.45 | 99.92 | 98.68 | 98.71 | 99.07 | 100 |
| OA | 93.96 | 95.25 | 95.19 | 95.93 | 93.46 | 97.33 | 98.94 |
| AA | 95.36 | 97.34 | 94.03 | 97.14 | 96.95 | 98.53 | 98.93 |
| Kappa | 0.93 | 0.95 | 0.95 | 0.95 | 0.93 | 0.97 | 0.99 |

It can be seen from Table 2 that in the Salinas data set, the SK-MSR algorithm generally has the most excellent classification accuracy, and shows the most stable state regardless of the relative size of sample quantity, thus the average classification accuracy is the highest. The excellent performance on Kappa coefficient that quantitatively measures the classification accuracy via the confusion matrix more adequately shows the stability and accuracy of Salinas in terms of large data amount. The classification results of Table 2 are the average data of operating 10 by various algorithms.

It can be seen from FIG. 5 that the SK-MSR algorithm basically realize the correct classification of Salinas data set, the scale of superpixel guarantees the removal of salt and pepper noise, and the border is relatively intact.

According to the characteristics of the Indian pines data set, that data set is used to verify the performance of the comparison algorithm and the target algorithm when the training samples are not adequate. 10% of all the marked pixels are randomly selected as the training samples, remaining 90% pixels are used as test samples, and the actual allocation of sample quantities is shown in Table 3.

TABLE 3

Indian Pines Sample Allocation

| Class | Name | Train | Test |
|---|---|---|---|
| 1 | Alfalfa | 5 | 41 |
| 2 | Corn-notill | 143 | 1285 |
| 3 | Corn-mintil | 83 | 747 |
| 4 | Corn | 24 | 213 |
| 5 | Grass-pasture | 48 | 435 |
| 6 | Grass-trees | 73 | 657 |
| 7 | Grass-pasture-mowed | 3 | 25 |
| 8 | Hay-windrowed | 48 | 430 |
| 9 | Oats | 2 | 18 |
| 10 | Soybean-notill | 97 | 875 |
| 11 | Soybean-mintill | 246 | 2209 |
| 12 | Soybean-clean | 59 | 534 |
| 13 | Wheat | 21 | 184 |
| 14 | Woods | 127 | 1138 |
| 15 | Buildings-grass-trees-drive | 39 | 347 |
| 16 | Store-steel-towers | 9 | 84 |
| | Total | 1027 | 9222 |

It can be seen from Table 3 that in the Indian Pines data set, the sample quantities of different classes vary widely, and typical high dimension and small sample signals exist. In many algorithms, the problem of small sample arises.

TABLE 4

Indian Pines Classification Results

| Class | JSM | NLW-SR | SASR | MSSR | MJSR | MASR | SK-MSR |
|---|---|---|---|---|---|---|---|
| 1 | 94.20 | 96.34 | 95.12 | 90.24 | 96.51 | 94.63 | 100 |
| 2 | 94.56 | 95.30 | 95.75 | 96.18 | 94.19 | 97.01 | 97.50 |
| 3 | 93.25 | 93.50 | 95.44 | 95.54 | 94.68 | 97.63 | 97.59 |
| 4 | 91.13 | 87.88 | 93.56 | 93.89 | 92.55 | 97.60 | 96.24 |
| 5 | 93.50 | 95.70 | 93.31 | 93.86 | 96.78 | 97.42 | 95.86 |
| 6 | 94.15 | 99.31 | 93.07 | 90.71 | 99.76 | 99.86 | 99.54 |
| 7 | 78.00 | 56.40 | 77.20 | 77.33 | 100 | 96.80 | 100 |
| 8 | 99.36 | 99.86 | 99.97 | 100 | 99.96 | 100 | 99.76 |
| 9 | 18.05 | 50.55 | 30.55 | 16.51 | 83.33 | 77.77 | 66.66 |
| 10 | 92.65 | 92.68 | 93.12 | 89.14 | 97.73 | 98.29 | 97.14 |
| 11 | 97.00 | 96.43 | 96.67 | 97.02 | 97.40 | 98.78 | 99.41 |
| 12 | 89.18 | 91.14 | 90.05 | 89.51 | 93.36 | 97.79 | 93.82 |
| 13 | 88.24 | 91.52 | 79.29 | 61.95 | 99.84 | 99.51 | 100 |
| 14 | 98.09 | 99.63 | 98.08 | 99.56 | 99.68 | 100 | 100 |
| 15 | 95.06 | 89.97 | 95.47 | 93.08 | 86.94 | 98.04 | 100 |
| 16 | 76.78 | 98.09 | 84.64 | 98.41 | 93.19 | 96.07 | 76.19 |
| OA | 94.58 | 95.38 | 94.88 | 94.54 | 96.55 | 98.43 | 98.08 |
| AA | 87.08 | 89.64 | 88.21 | 86.89 | 95.37 | 96.70 | 94.984 |
| Kappa | 0.93 | 0.95 | 0.94 | 0.94 | 0.96 | 0.98 | 0.98 |

It can be seen from Table 4 that due to certain sample expansion, the SK-MSR algorithm of the present invention has good performance in small sample classes 1, 7 and 9. However, due to high degree of similarity among the Indian Pines data set samples (basically the plant samples) and mosaic distribution of different classes (as shown in FIG. 3), the overall performance of SK-MSR is not as good as that of the MASR algorithm, but is better than those of other contrast algorithms. It is observed that the SK-MSR algorithm is less suitable for the class that lacks in samples, but has relatively good and stable performance on the data set of that class and is relatively good at processing high dimension and small sample signals. The classification results of Table 4 are the average data of operating 10 by various algorithms.

It can be seen from FIG. 6 that due to the mosaic distribution of similar samples in the Indian Pines data set, the SK-MSR algorithm basically guarantees the correct classification in case of insufficient training samples, but the border regions of similar samples cannot be split out with utmost accuracy and precision.

To prove the performance of the SK-MSR algorithm under circumstances of adequate training samples and large data amount of test samples, the Pavia University data set is selected once again for verification. 300 marked pixels of each class are randomly selected as the training samples, the remaining pixels are used as the test samples, and the actual allocation of sample quantities is shown in Table 5.

TABLE 5

Pavia University Sample Allocation

| Class | Name | Train | Test |
|---|---|---|---|
| 1 | Asphalt | 300 | 6331 |
| 2 | Meadows | 300 | 18349 |
| 3 | Gravel | 300 | 1799 |
| 4 | Trees | 300 | 2764 |
| 5 | Metal sheets | 300 | 1045 |
| 6 | Bare soil | 300 | 4729 |
| 7 | Bitumen | 300 | 1030 |
| 8 | Bricks | 300 | 3382 |
| 9 | Shadows | 300 | 647 |
| | Total | 2700 | 40076 |

Under this kind of training sample selection, all the algorithms shall be able to generate a sufficiently complete dictionary, and sufficient to fully verify the performance of the contrast algorithm and the SK-MSR target algorithm.

TABLE 6

Pavia University Classification Result

| Class | JSM | NLW-SR | SASR | MSSR | MJSR | MASR | SK-MSR |
|---|---|---|---|---|---|---|---|
| 1 | 91.08 | 90.25 | 91.45 | 90.51 | 81.08 | 94.34 | 96.39 |
| 2 | 97.69 | 97.13 | 97.83 | 98.03 | 95.29 | 99.24 | 99.54 |
| 3 | 99.15 | 99.80 | 99.34 | 99.46 | 98.65 | 99.80 | 99.94 |
| 4 | 96.26 | 97.42 | 88.04 | 94.27 | 97.35 | 97.49 | 98.04 |
| 5 | 98.52 | 99.97 | 96.61 | 99.63 | 100 | 100 | 100 |
| 6 | 99.57 | 99.50 | 99.87 | 99.82 | 94.91 | 99.87 | 100 |
| 7 | 98.89 | 98.85 | 98.26 | 99.74 | 99.70 | 100 | 99.90 |
| 8 | 97.37 | 98.24 | 98.08 | 98.69 | 96.09 | 99.45 | 99.97 |
| 9 | 41.57 | 86.70 | 82.86 | 89.57 | 89.29 | 97.10 | 99.38 |
| OA | 95.89 | 96.50 | 96.21 | 96.87 | 93.50 | 98.47 | 99.07 |
| AA | 91.02 | 96.43 | 94.70 | 96.64 | 94.70 | 98.59 | 99.24 |
| Kappa | 0.94 | 0.95 | 0.95 | 0.96 | 0.91 | 0.98 | 0.99 |

It can be seen from Table 6 that when abundant training samples can be extracted from the data set, the SK-MSR algorithm has obviously better classification accuracy than other algorithms. The classification results of Table 6 are the average data of operating 10 by various algorithms.

According to FIG. 7, it is clear that the SK-MSR algorithm basically achieves exactly correct segmentation on Pavia University, and abundant training samples ensures that the algorithm has excellent correct classification result.

By performance comparison on the three data sets, it is observed that, from a comprehensive perspective, the SK-MSR algorithm has the most stable performance and the highest classification accuracy among all the algorithms used during the experiment. In the situations with normal sample quantity, less sample quantity and adequate sample quantity, the SK-MSR algorithm has stable and high classification accuracy, and particularly with the increase in the sample quantity, the advantages of the SK-MSR algorithm become increasingly apparent.

This embodiment provides a comprehensive introduction of the implementation process of semi-supervised K-SVD dictionary learning algorithm, and designs the superpixel classification algorithm of multiscale sparse representation that uses the superpixel spatial information according to the characteristics of hyperspectral images. After explaining the reason and the method of introducing superpixel spatial information, this embodiment describes the complete algorithm implementation process. Finally, the contrast experiment on multiple data sets confirms the technical effect of the present invention, that is the proposing of the algorithm is of great significance to solving the problem of salt and pepper noise and the problem of high dimension and small samples in the field of hyperspectral image classification, as well as the problem of how to effectively use space information in classification algorithm based on sparse representation.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. A superpixel classification method based on semi-supervised K-SVD and multiscale sparse representation, in which software test results are displayed by the monitor, characterized by comprising the following steps:
    step 1: carrying out semi-supervised K-SVD dictionary learning on the training samples of a hyperspectral image, and thus to obtain an overcomplete dictionary;
    step 2: using the training samples and the overcomplete dictionary as the input to obtain the multiscale sparse solution of superpixels, and thus to obtain the sparse representation coefficient matrix of the training samples;
    step 3, using the obtained sparse representation coefficient matrix and overcomplete dictionary to obtain the result of superpixel classification by residual method and superpixel voting mechanism.

2. The superpixel classification method based on semi-supervised K-SVD and multiscale sparse representation according to claim 1, characterized in that the step 1 specifically comprises:

1) using the training samples of the hyperspectral image as the initial dictionary, and denoting the superpixel where the training samples $x_p$ are located as $X_p^{ex}=[x_p^1, \ldots, x_p^{S_p}] \in R^{B \times S_p}$, wherein $S_p$ represents number of pixels contained in the superpixel $X_p^{ex}$, $x_p^s$ ($1 \leq s \leq S_p$) represents an unlabeled sample in the superpixel $X_p^{ex}$; expanding each of the training samples $x_p$ to obtain a new training sample set $$X^{ex}=[X_1^{ex}, \ldots, X_P^{ex}] \in R^{B \times P^{ex}}$$

wherein $P^{ex}=\sum_{p=1}^{P} S_p$ represents the total number of the new samples;

2) each of the training samples $x_p$ having a corresponding label $l_p$ ($1 \leq l_p \leq U$), wherein U is the number of classes, and except that the training samples $x_p$ have labels $l_p$, the labels of other samples in the superpixel $X_p^{ex}$ are regarded as $l_p$.

3. The superpixel classification method based on semi-supervised K-SVD and multiscale sparse representation according to claim 1, characterized in that a joint sparse model is adopted in the step 2 to obtain the sparse solution during sparse dictionary learning process, which specifically comprises:

1) assuming all samples with labels u in the new training sample set $X^{ex}$ as one set, wherein $1 \leq u \leq U$, $$X_u=[x_1, \ldots, x_c, \ldots, x_{C_u}] \in R^{B \times C_u}$$

$X_u$ is a $B \times C_u$ matrix and represents a set composed of $C_u$ pixels, the set is a set of all samples with labels u in $X^{ex}$, and each pixel $x_c$ contains B spectral layers, wherein $1 \leq c \leq C_u$; the set satisfies that $$\{X_u\}_p^P = \{X_u \subseteq X^{ex} | L(X_u)=u\}$$

wherein $L(X_u)$ represents a function for obtaining $X_u$ labels;

2) for a plurality of pixels in basically the same class of ground object materials, regarding the plurality of pixels as locally smooth and sparse areas;

3) sharing a common sparse mode by $X_u$ of the same class of labels, and then $C_p$ pixels can approximate the sparse representation through the atomic combination of the overcomplete dictionary:

$$X_u=[x_1, \ldots, x_c, \ldots, x_{C_u}] \approx D[a_1, \ldots, a_{C_u}]$$

wherein $D \in R^{B \times N_D}$ is the overcomplete dictionary with $N_D$ atoms and labels corresponding to each atom, and the atoms are the column vectors in the overcomplete dictionary D;

$A_u \in R^{N_D \times C_P}$ is the matrix of sparse coefficient $[a_1, \ldots, a_{C_u}]$; due to local smoothness and sparsity, all sparse coefficient vectors $\{a_c\}_1^{C_u}$ are assumed to have the same non-zero row position if $A_u$ has only $L_C$ ($L_C \ll N_D$) non-zero rows therein;

4) solving $A_u$ by solving the joint sparse recovery problem:

$$\widehat{A_u} = \arg\min_A \|X_u - DA_u\|_2^2$$

$$\|A_u\|_{row,0} \leq L_C$$

wherein $\|A_u\|_{row,0}$ is $l_0$ norm obtained by rows, and is the number of non-zero rows of $A_u$.

4. The superpixel classification method based on semi-supervised K-SVD and multiscale sparse representation according to claim 3, characterized in that the joint sparse recovery problem is solved by orthogonal matching pursuit, and at this point, the overcomplete dictionary D is normalized by columns to make the $l_{2^c}^1$ norm unitized.

5. The superpixel classification method based on semi-supervised K-SVD and multiscale sparse representation according to claim 1, characterized in that the step 3 specifically comprises:

1) giving a test pixel $y_1$ in a hyperspectral image, selecting T adjacent areas of different scales/dimensions, and arranging the pixels in the selected area to construct the corresponding multiscale matrix $Y^{multiscale}=[Y_1, \ldots, Y_t, \ldots, Y_T]$, wherein $Y_t$ includes the pixels from the $t^{th}$ scale area;

2) rewritting the sparse representation problem of T scales as $$\{\hat{A}\}_{t=1}^T = \arg\min_{\{A_t\}} \sum_{t=1}^T \|Y_t - DA_t\|_F$$

$$\|A_t\|_{row,0} \leq K \forall\, 1 \leq t \leq T$$

wherein $[A_1, \ldots, A_t, \ldots, A_T]$ is the sparse coefficient of $[Y_1, \ldots, Y_t, \ldots, Y_T]$, which constitutes the multiscale sparse representation matrix $A^{multiscale}$;

3) creating an adaptive set $L_h$, wherein h=1, 2, ... is expressed as the index of a set of non-zero scalar coefficients and belongs to the same class in the multiscale sparse representation matrix $A^{multiscale}$; for columns in each scale of $A^{multiscale}$, indexes of adaptive set $L_h$ are in the same row;

4) determining the class of the test pixel $y_1$ based on the minimum total representing error $$\hat{c} = \arg\min_c \left\| Y^{multiscale} - D_c \hat{A}_c^{multiscale} \right\|_F$$

$\hat{A}_c^{multiscale}$ represents the row corresponding to class c in $\hat{A}^{multiscale}$.

6. The superpixel classification method based on semi-supervised K-SVD and multiscale sparse representation according to claim 5, characterized in that the sparse representation problem of T scales is solved by orthogonal matching pursuit.

7. The superpixel classification method based on semi-supervised K-SVD and multiscale sparse representation according to claim 5, characterized in that the steps to select the adaptive set in step 3) are as follows:

(1) finding a representing atom with the minimum residual error for each scale and each class;
(2) combining the optimum atoms of all scales of each class into a cluster;
(3) selecting the optimum cluster from clusters of all the classes and recording the index of atoms in the cluster as the adaptive set.

8. The superpixel classification method based on semi-supervised K-SVD and multiscale sparse representation according to claim 7, characterized in that the sparse coefficient required by the multiscale pixel need to be beneficial to the sparse mode of the same class level, but at the same time sparse modes of different scale levels are allowed within each class.

9. The superpixel classification method based on semi-supervised K-SVD and multiscale sparse representation according to claim 5, characterized in that to combine and classify the information of different scales, the joint sparse constraint $l_{row,\,0}$ is applied to solve the multiscale sparse representation matrix $A^{multiscale}$, which enables the sparse coefficients of different scales share the same sparse mode, i.e., the same atom set is selected to represent pixels of different scales; at this point, $A^{multiscale}$ is jointly restored by solving the following problem:

$$\hat{A}^{multiscale} = \arg\min_{A^{multiscale}} \|Y^{multiscale} - DA^{multiscale}\|_F \quad (5)$$

wherein $\|A^{multiscale}\|_{row,0} \leq K$

10. The superpixel classification method based on semi-supervised K-SVD and multiscale sparse representation according to claim 5, characterized in that the method further comprises the following step after step 4): performing the superpixel voting process once again by using the superpixels with the least scale.

\* \* \* \* \*